US007389247B2

(12) United States Patent
Pestoni et al.

(10) Patent No.: US 7,389,247 B2
(45) Date of Patent: Jun. 17, 2008

(54) CONTENT INSURANCE

(75) Inventors: Florian Pestoni, Mountain View, CA (US); Dalit Naor, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1614 days.

(21) Appl. No.: 09/759,163

(22) Filed: Jan. 16, 2001

(65) Prior Publication Data

US 2002/0095384 A1 Jul. 18, 2002

(51) Int. Cl.
*G06Q 40/00* (2006.01)
(52) U.S. Cl. ............................. 705/4; 705/50; 705/51; 705/59
(58) Field of Classification Search .................. 705/4, 705/50, 51, 59
See application file for complete search history.

(56) References Cited

U.S. PATENT DOCUMENTS

| 5,673,316 | A | 9/1997 | Auerbach et al. ............ 380/4 |
| 5,933,498 | A | 8/1999 | Schneck et al. ............. 380/4 |
| 5,982,891 | A | 11/1999 | Ginter et al. .............. 380/4 |
| 6,018,714 | A * | 1/2000 | Risen et al. .................. 705/4 |
| 6,038,316 | A | 3/2000 | Dwork et al. .............. 380/25 |
| 6,119,108 | A | 9/2000 | Holmes et al. ............. 705/40 |
| 6,708,157 | B2 * | 3/2004 | Stefik et al. ................ 705/59 |
| 6,873,958 | B2 * | 3/2005 | Artinger ..................... 705/4 |

OTHER PUBLICATIONS

PR Newswire, eMedia-IT and Lloyds of London Provide Global Insurance for Digital Content; Mar. 3, 2000, p. 1.*
Business Wire, NRMS Introduces the Revolutionary Insure Trust Insurance Policy for Trusted Networks, E-Commerce and Internet Liability; Jul. 1, 1998, p. 1.*
Business Wire, NRMS Introduces the Revolutionary InsureTrust Insurance Policy for Trusted Networks, E-Commerce and Internet Liability; Jul. 1, 1998, p. 1.*

* cited by examiner

*Primary Examiner*—Robert W Morgan
(74) *Attorney, Agent, or Firm*—IP Authority, LLC; Ramraj Soundararajan; Daniel E. Johnson

(57) ABSTRACT

The present invention provides for the protection of and ability to upgrade to new formats of digital content by providing consumers of the digital content the capability of purchasing content insurance on digital content they consume. By purchasing insurance on content, at a later time consumers are able to return to the content distribution channels and re-obtain the previously purchased content in the same, or new format as the original purchased.

8 Claims, 18 Drawing Sheets

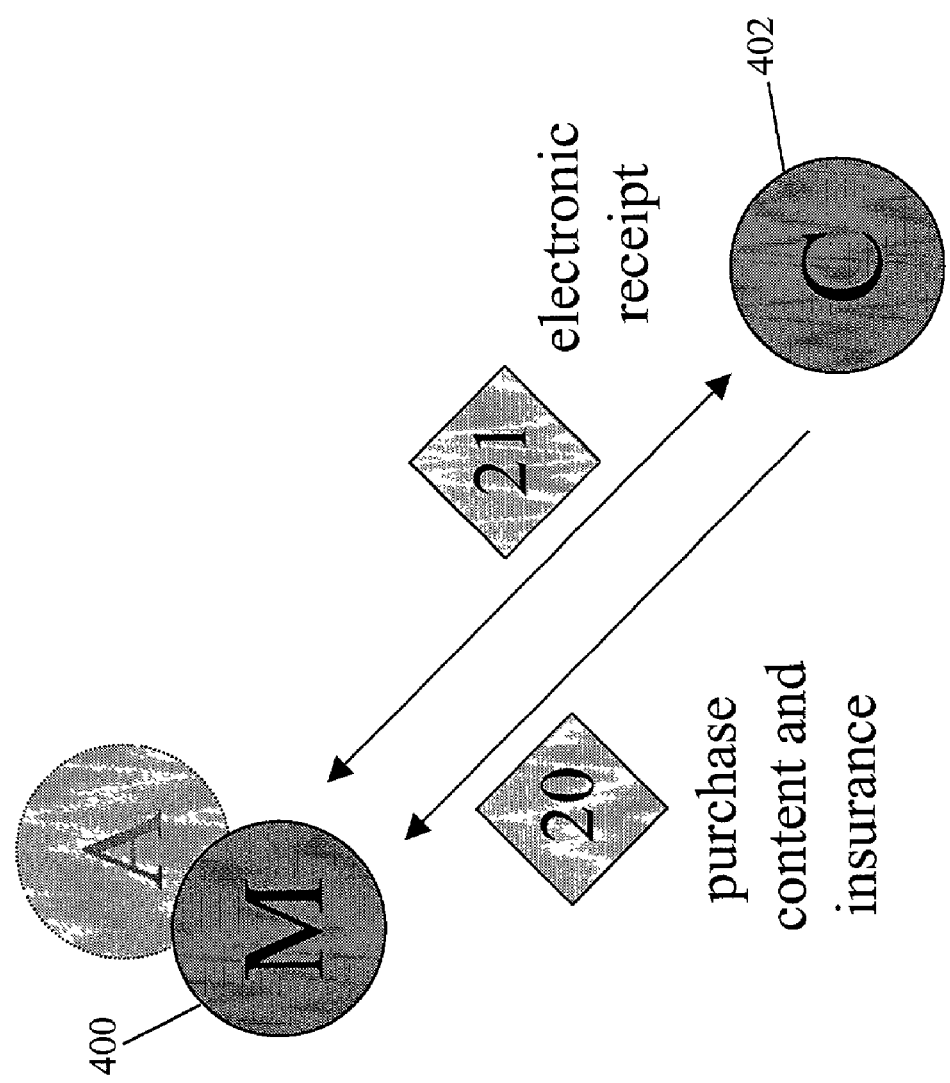

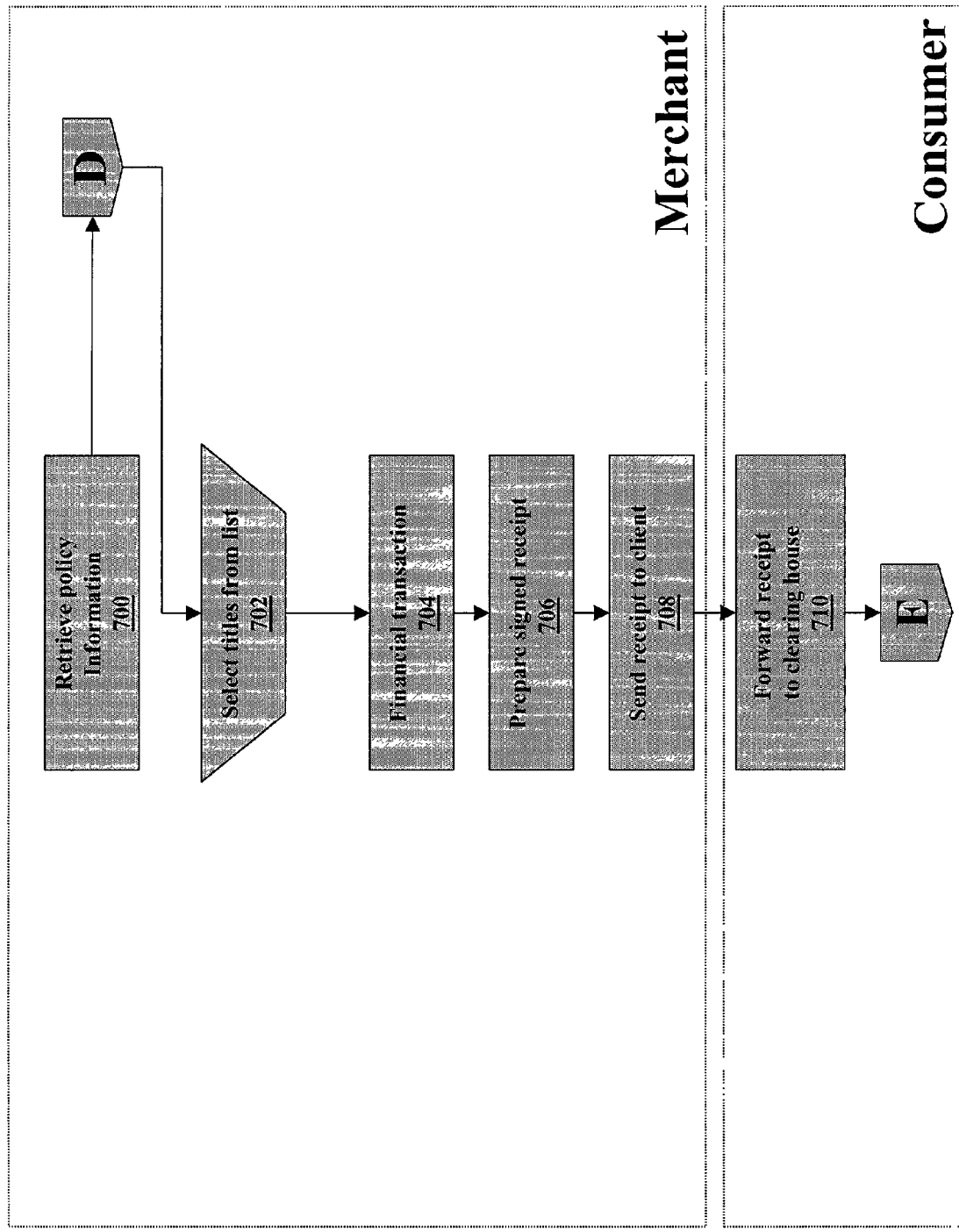

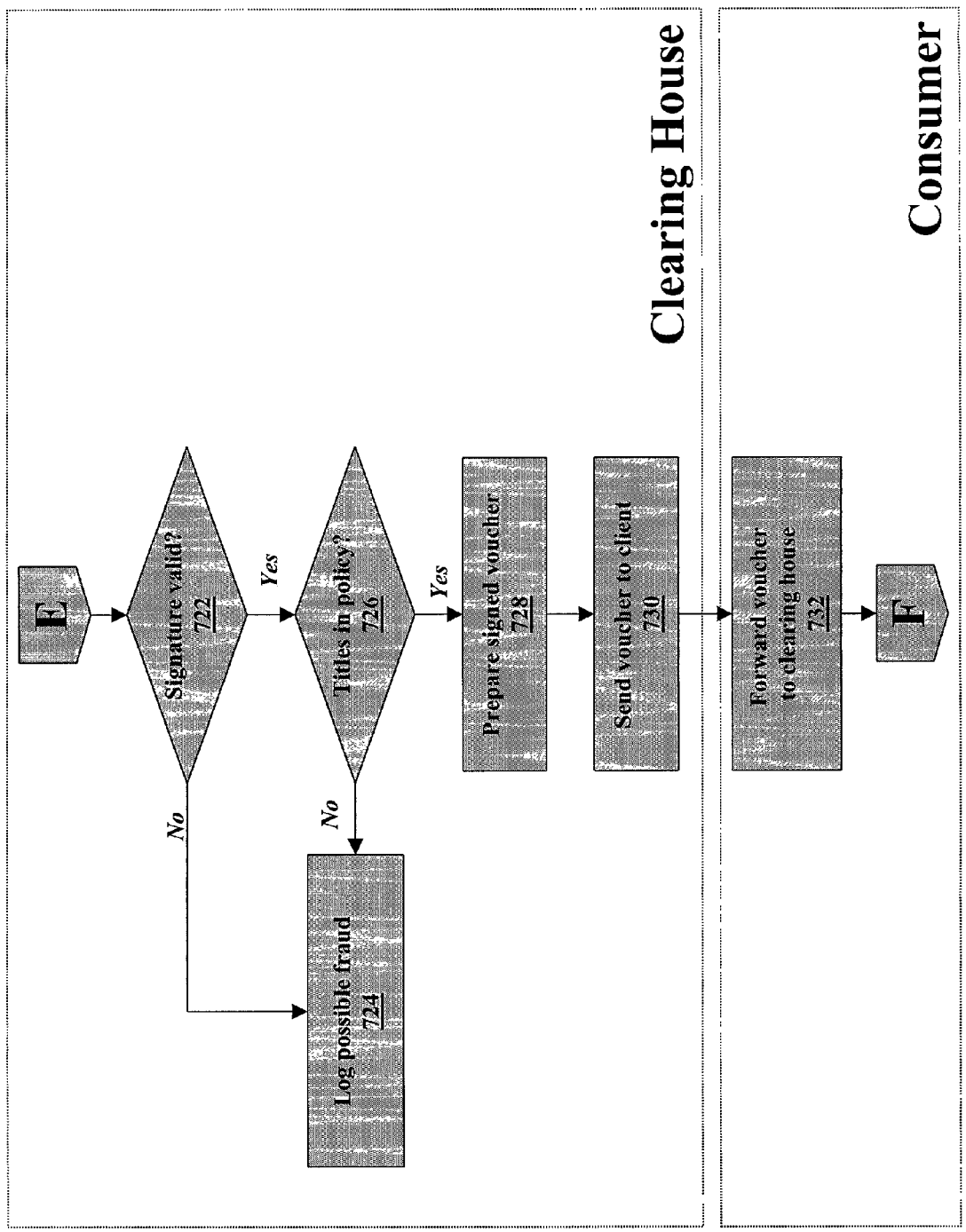

CONTENT INSURANCE

BACKGROUND OF THE INVENTION

1. Field of Invention

The present invention relates generally to the field of digital content distribution. More specifically, the present invention is related to protecting and upgrading digital content in a digital content distribution system through the use of content insurance.

2. Background

As more and more content is created or made available in digital form and as the ways of distributing such content change, new challenges are arising in terms of preserving this content. The reliability of storage systems such as hard disks or solid state memories is quite high, but data loss is not uncommon. This may be due to hardware or software failures, as well as human errors or intentional destruction, as is the case for computer viruses.

This is a potential problem in data storage for personal use as well as within organizations; however, the latter are more likely to take measures to protect their data through backups. Nevertheless, large amounts of data still remain unprotected in corporations and especially in small businesses. The percentage of data that has not been backed up is typically even higher in private computers or other consumer electronic devices.

A shared characteristic of the various forms of content intended to be distributed for commercial purposes is that the original costs of production are several orders of magnitude more than production of each individual copy thereafter. Technological advances, from Gutenberg's press to the World Wide Web, continue to widen that gap.

When consumers of that content buy a copy, be it a song, a motion picture or a news article, an insignificant percentage of the purchase price goes to cover the marginal cost of distributing that copy. This is even more clear on the Internet, where most, if not all, costs incurred by the distributor when content is downloaded, are fixed.

Content itself is not sold to consumers, but rather is implicitly licensed to them. As an example, one of the most widespread implicit licensing agreements for copyrighted material is that used in the sales of music records. Under the conditions of this agreement, the buyer purchases limited rights to listen to the contents of a piece of media—vinyl record, cassette tape, compact disc, or similar technologies—for as long as this media is usable. Limited copies are generally also considered "fair use" as long as they meet certain requirements.

Different types of media have different useful lives. For instance, analog cassette tapes contain magnetic materials that were polarized to encode an audio signal; the quality of this encoding would progressively fade with repeated playback, fast forward/rewind, heat and other external factors. Typical useful life of a cassette tape was two years or 20 playbacks, whichever happened first, before quality was noticeably lower than when originally recorded.

Compact discs and related technologies like DVD use optical methods to read and write information, which is digitally encoded. These media are therefore not subject to the progressive quality degradation described above, but if the surface gets too dirty or scratched then whole sections may be lost. CDs are also relatively fragile and do not stand significant physical stress.

More recently, with the advent of cheaper magnetic heads and solid state storage combined with advanced compression techniques, the use of "general purpose" computer storage has become an economically viable alternative for storage of content in digital form. In addition, with the advent of these technological advances, the distribution of content has begun to move from traditional hard media to electronic distribution over communication networks such as the Internet.

With the interplay of decreased marginal cost of reproduction of content in digital form and property rights of such content, a number of content distribution models have arisen. One such model is a direct content distribution model, illustrated in FIG. 1a. In this model, a merchant 100 receives digital content from the content owner 104 and the digital content is stored at the merchant's site. The consumer 102 shops at the merchant's site and purchases content from merchant 100. Once the content is purchased from merchant 100, the content is downloaded from merchant 100 to consumer 102.

A second content distribution model is depicted in FIG. 1b. In this model, consumer 102 purchases content from a merchant 100. When consumer 102 purchases content from merchant 100, merchant 100 informs clearing house 106 of this transaction. Clearing house 106 then generates a voucher for the purchase. This voucher is then presented to content owner 104, allowing consumer 102 to download the content from owner 104. The voucher is presented to owner 104 either by clearing house 106 or consumer 102.

Typically, in the distribution models, there is a concern about controlling the distribution of the content in order to protect the property rights of the content owners. Other technological advances, such as in cryptography and digital rights management systems, have also encouraged the electronic distribution of digital content. U.S. Pat. Nos. 5,933,498; 5,982,891; 5,673,316; and 6,119,108 generally illustrate content distribution models incorporating these other technological advances.

While economics and technological advances provide incentives for electronic distribution of digital content, there are, however, still problems associated with this distribution which hamper the acceptance of such distribution, both on the part of content owners and consumers. While top of the line storage systems are highly reliable, they are still subject to hardware failure. Even more likely are other sources of accidental loss of data: operating system problems that could affect the file system are not infrequent, viruses could destroy data stored on disk and users may unknowingly delete files containing purchased content.

In addition, there are other disincentives for consumers to accept electronic distribution of content. As technology surrounding encoding of this content continues to advance at a rapid rate, and as the cost of distributing the content via communication mediums such as the Internet is greatly reduced in comparison to hard media distribution of content, it is quite possible that owners and distributors of content will likely be willing to change content formats at a much faster rate than is the current practice. Moreover, due to the fast pace of technological change, consumers may be concerned that the specific format that is offered today will be superseded by a new one in a short lapse of time, and that old content will either be incompatible with new players or will lack the quality of newer formats.

Most content commercially available, such as news and entertainment content, has one common characteristic: it does not change over time. As noted, the media or encoding may change over time, e.g., from big screen format to 8 mm to VHS to DVD, however, the actual content remains constant. If an individual copy of a classic is lost, becomes damaged, or there is not a player compatible with a particular format available, a new copy would be a perfect substitute for the old one, with the possible exception of copies that are considered memorabilia. That is, a new copy of the content would perfectly replace the old content.

The present invention leverages the stability of this type of content by providing an insurance policy that can be purchased alongside digital content. Should an unexpected loss of data occur, the policyholder would be entitled to a new copy of the same material. In another embodiment, the present invention has the additional advantage of guaranteeing to consumers that new encodings of the same content they have already purchased would be made available to them as technology evolves. These would improve the adoption rate of digital distribution of content by reducing switching costs and the perceived risks, and, in addition, increase revenues to members of the distribution channel.

SUMMARY OF THE INVENTION

The present invention provides for the protection of and ability to upgrade to new formats of digital content by providing consumers the capability of purchasing content insurance on digital content they consume. By purchasing insurance on content, at a later time consumers are able to return to the content distribution channels and re-obtain the previously purchased content.

In a further embodiment, by purchasing insurance on content, at a later time consumers are able to return to the content distribution channels and obtain the previously purchased content in a new format.

In a further embodiment, a marginal price is charged to obtain the previously purchased content in a new format.

In further embodiments of the present invention, measures are implemented to prevent fraudulent claims and generally discourage abuses of the system. These include restricting the number of claims that are able to be filed; requiring payment of a deductible; requiring disclosure of private information to submit a claim; limiting availability of content format upgrades; and limiting the term of content format upgrade with an option to renew.

In the present invention, content insurance is distributed and maintained via an insurer and an insurance agent. An insurer maintains insurance polices including a list of titles a consumer has purchased content insurance on, verifies a consumer has purchased insurance on a title, provides a mechanism for accessing digital content once a claim is processed or otherwise provides services to allow a consumer who purchases insurance to process a claim. An insurance agent sells content insurance to consumers and accepts claims from consumers on behalf of an insurer. A secure electronic receipt is generated for each purchase of digital content. These receipts bind the buyer to the goods, i.e., a particular combination of bits, and can be redeemed at a later time in exchange for those same bits or an alternative representation of the same content. The insurer and agent are separate entities, or alternatively, the same entity.

The present invention is adaptable to be provided in conjunction with the purchase of digital content via a number of content distribution models, or distributed separately from the purchase of digital content and content distribution models. A number of exemplary insurance distribution embodiments are provided.

In a first embodiment, when a consumer purchases digital content from a merchant, the merchant offers to sell insurance on that content to the consumer. When the consumer purchases the offered insurance, the merchant generates information which binds the consumer to that specific copy of the content. The merchant then stores that information for each consumer. In the future when a new format arises, or the content is lost, the consumer files a claim with the merchant, who verifies their purchase with the generated information. Once verified, the consumer then retrieves a new copy of the digital content they had previously purchased.

In a second embodiment, a third party stores, maintains and verifies insurance information of a consumer, regardless of the merchant which the digital content was purchased from. When a consumer purchases content from a merchant, the completion of the transaction occurs through the third party. When insurance is purchased on the content, identifying information of the content and consumer information is stored at the third party. At a later time when the consumer places a claim, insurance information is retrieved from the third party and the third party acts to verify that the content of the claim is covered in the insurance the consumer has purchased.

In a third embodiment, the third party acts to verify that content subject to a claim is covered by the purchased insurance. When a consumer purchases content from a merchant, the completion of the transaction does not occur through the third party. Rather, secured information pertaining to the purchased insurance and content is stored by the consumer at the completion of the transaction. When the consumer presents a claim, this information is transmitted to the third party, who verifies the validity of the information, i.e., verifies that the content subject to a claim is covered in purchased insurance.

In a fourth embodiment, content insurance is purchased at a time disjoint from the purchase of the digital content. When a consumer purchases content from a merchant secured information pertaining only to the purchased content is stored by the consumer at the completion of the transaction. At a later time, when the consumer wants to purchase insurance, the consumer goes to an entity offering insurance for sale and presents the secured information. Once verified, the consumer is allowed to purchase insurance on the verified content.

The present invention is beneficial to all parties involved in the distribution of content for commercial purposes. Consumers would protect their property against loss for reasons beyond their control. Content owners may see their sales increase as a result of lowering the risk for consumers. Finally, distributors could provide this differentiating value-added service with limited additional cost.

As some consumers may hesitate to purchase material for fear that their investment will not last as long as they would expect in order to pay the price to acquire it, the present invention encourages them to purchase the material as it provides protection against this instance. Moreover, due to the fast pace of technological change, consumers may be concerned that the specific format that is offered today will be superseded by a new one in a short lapse of time, and that old content will either be incompatible with new players or will lack the quality of newer formats. The present invention reduces this risk for consumers.

While some percentage of current revenues for copyright owners derives from replacement of lost copies, the present scheme provides incentives which potentially increase current sales well beyond the present value of future purchases due to accidental loss. Format upgrades are likely to be more frequent in the digital world of downloadable content and players than in the physical distribution world.

Early adopters and audiophiles will want the latest format and will be able to upgrade frequently, generating incremental revenue; over a period of several years-the time it used to take to introduce a new, backwards incompatible technology-consumers will upgrade many times, thus approaching the revenue levels of previous technologies with longer lifecycles. Other users will have the flexibility of upgrading only when new formats represent a significant advantage.

In the traditional model for sales of media, the rights to which the user is entitled are usually rather inflexible. Its electronic counterpart, namely digital content distribution, allows for a much richer menu of licensing options. For example, some content may be available for free download, but with only a limited number of playbacks allowed. These rights are typically enforced by the DRMS. Therefore, the DRMS must determine what content is eligible for being insured, and include in the proof of user rights only those titles. In this example above, the title with limited playback options may be deemed ineligible, as the counter is maintained locally and it may not be feasible to keep the list of titles in the content insurance policy synchronized.

BRIEF DESCRIPTION OF THE DRAWINGS

FIGS. 4a and 4b, collectively, illustrate an embodiment in which the consumer maintains receipts and a third party verifies insurance policy information.

FIGS. 7a-7d, collectively, illustrate an example claim transaction of the second embodiment of the present invention which additionally employs the copyright protection scheme.

DESCRIPTION OF THE PREFERRED EMBODIMENTS

Figure 1A:
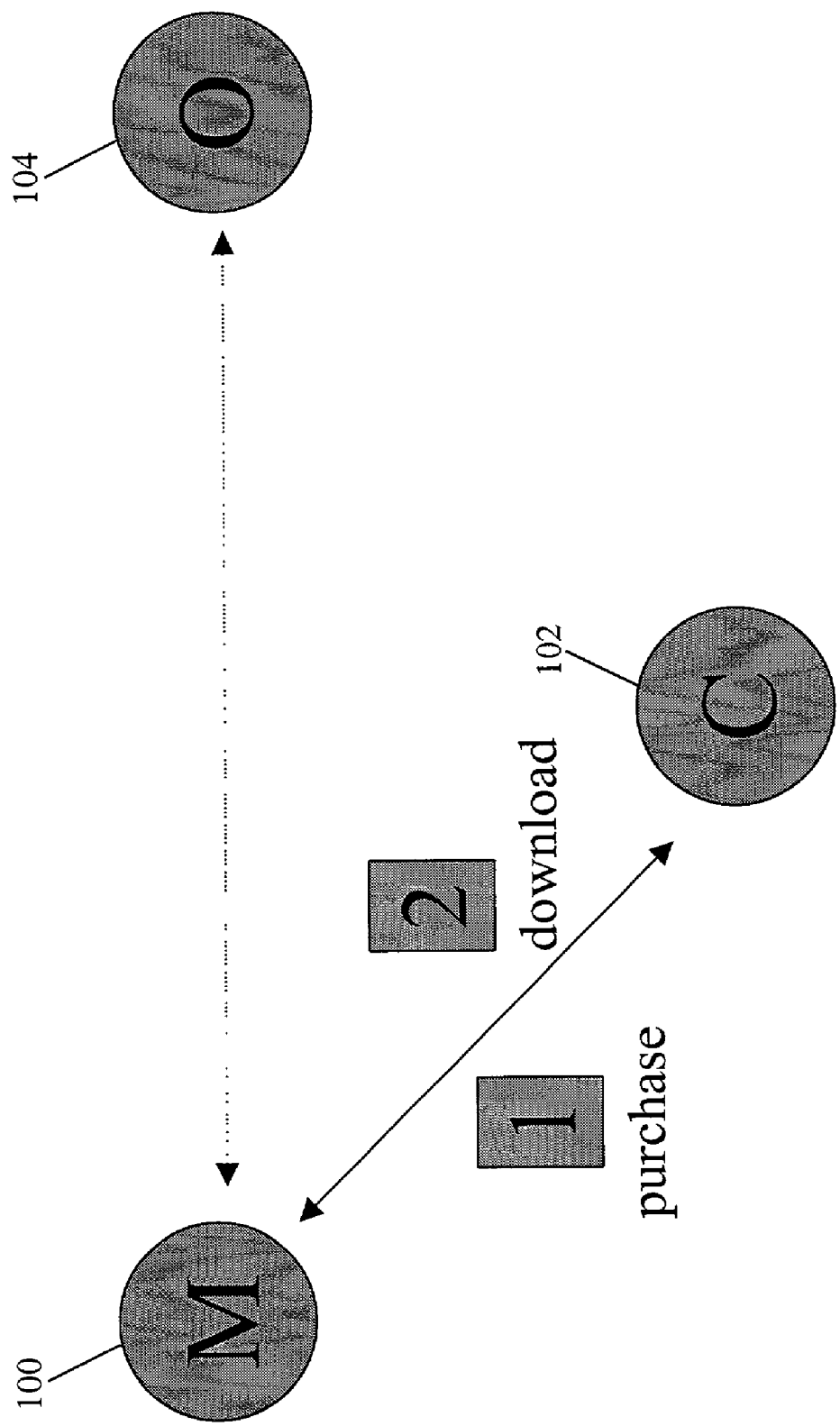
FIGS. 1a and 1b illustrate two digital content distribution models.
Figure 1B:
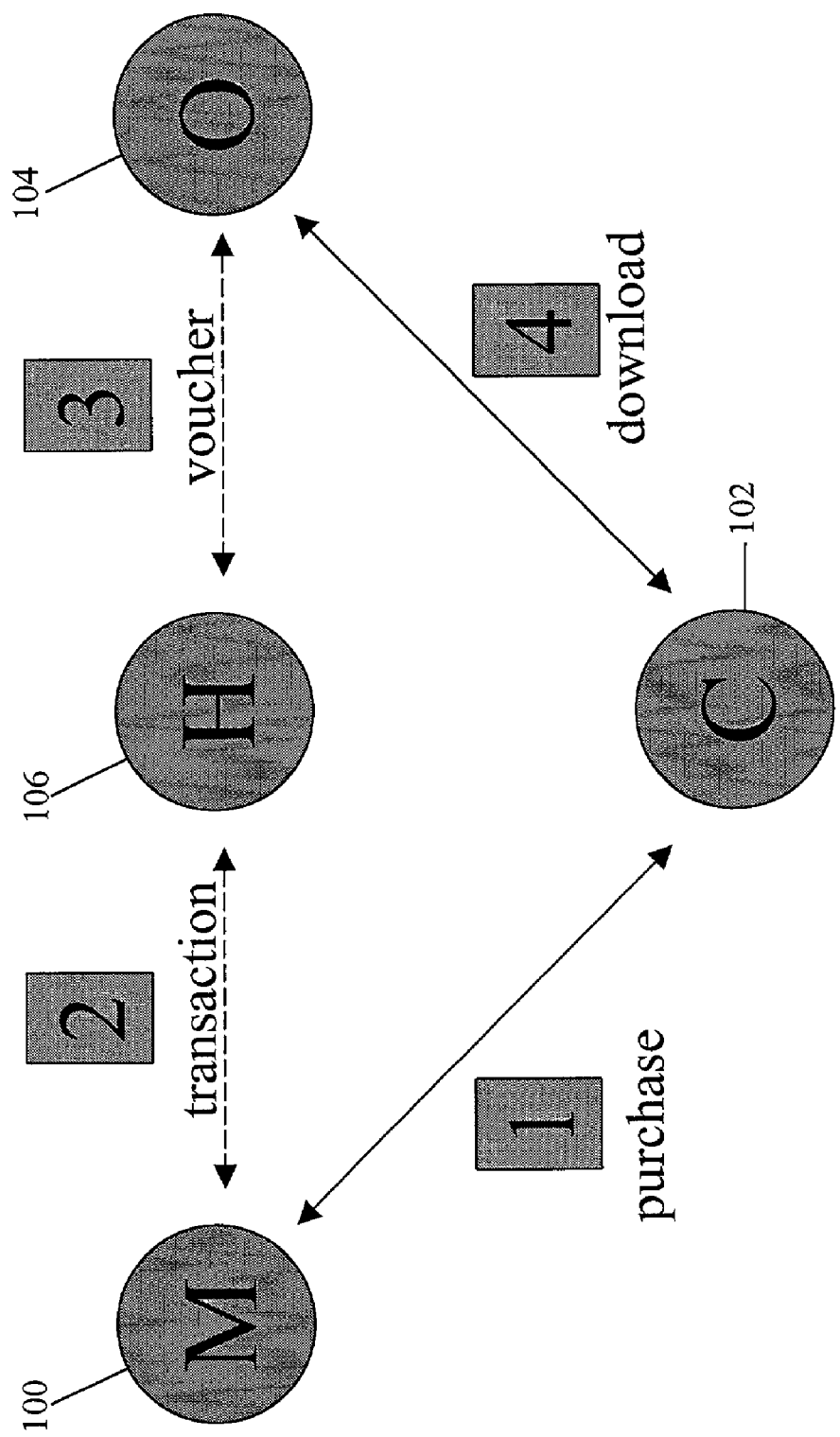

While this invention is illustrated and described in a preferred embodiment, the device may be produced in many different configurations and forms. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Generally, the present invention comprises selling content insurance on digital content to consumers of the digital content, which is distributed electronically, i.e., via communication networks such as the Internet, at a fraction of the cost of the digital content. The content insurance insures a consumer against the loss of the digital content for which the consumer has purchased insurance. Once a consumer has purchased content insurance, if there is a loss the consumer may place a claim for lost content and upon verification the consumer has actually purchased insurance on the lost content, the consumer is capable of re-obtaining the same digital content.

In another embodiment, the content insurance insures the consumer against the advent of new digital formats, either in addition to insuring against loss, or separate therefrom. In this embodiment, once a purchaser has purchased content insurance, the consumer may place a claim for content for which there is a new digital format and upon verification the user has purchased insurance on such content, the consumer is capable of obtaining the digital content in the new digital format. In a further embodiment, when content insurance covers the advent of new digital formats, a marginal price is charged to the consumer for an upgrade, generating additional revenues.

For digital content distributed electronically, the marginal cost of distributing such content is close to zero. Therefore, the redistribution of a copy to a consumer placing a claim is close to zero. As such, the revenue generated from the sale of insurance is not defrayed by the cost of redistribution, making the revenue essentially all profit for distribution among the parties participating in the transaction. In addition, the present invention reduces perceived and actual risks to consumers of digital content and therefore would increase sales of digital content.

It should be noted, while it is envisioned that the price charged for content insurance and the marginal price for upgrades is a fraction of the cost of the digital content, the present invention should not be seen as limited to such. In a free market, the appropriate prices charged for insurance and to upgrade would be dictated by the market forces, and would typically be the market clearing prices for the insurance and upgrade, respectively.

The embodiments of the present invention further comprise mechanisms that prevent consumers from making fraudulent claims, or otherwise abusing the content. The terms and conditions of the service include restrictions on the number of claims that can be filed; require payment of a deductible to discourage isolated, repetitive claims; require disclosing private information such as the insured party's credit card number, thus discouraging users from making their policy widely available; limit availability of content format upgrades or have a limited term with the option of renewal, possibly requiring an additional fee. These characteristics make the system unattractive as a means for illegal distribution of content while at the same time making it convenient for legal users. In addition, the common characteristic across all embodiments is that they are based on replacing the actual content instead of refunding consumers. This also limits abuse of the system.

The present invention is adaptable to be used in parallel to a number of different content distribution systems with various parties of the distribution chain performing roles needed to implement the sale of content insurance, or it is capable of being set up as a separate distribution model itself without the parties of the content distribution chain performing functions related to selling insurance or processing claims. The following discussion presents exemplary embodiments of the present invention adapted to content distribution schemes previously discussed and an exemplary embodiment for a separate content insurance distribution scheme.

In the following discussion several roles are identified: consumers (C) purchase content online; merchants (M) offer content for sale; content owners (O) make their content available to merchants; insurers (I) provide the services described as content insurance. Some embodiments involve the use of a clearing house (H), in addition, some embodiments use the concept of an insurance agent (A) who sells content insurance and accepts insurance claims on behalf of the insurer. It should be noted that more than one role may be played by the same party. For example, a content owner may also be a merchant, or an insurer may also be an insurance agent. Similarly, a role may in fact involve more than two or more companies bound by contractual agreements.

Figure 2A:
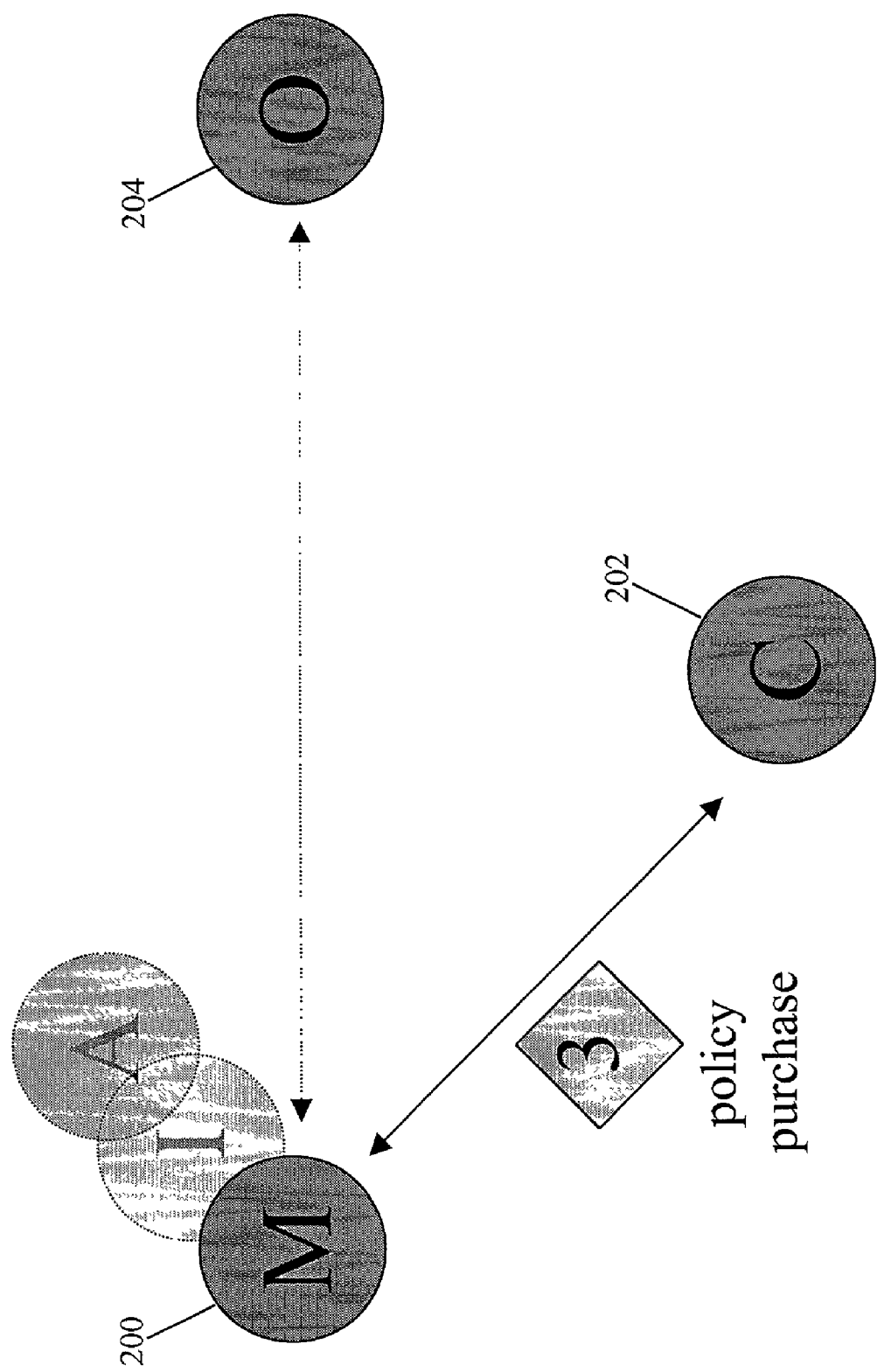
FIGS. 2a and 2b illustrate an embodiment in which a merchant maintains insurance policy information.

The first embodiment is generally illustrated in FIG. 2a. In this embodiment, a merchant 200 also acts as the insurer and insurance agent. Content owner 204 provides content to merchant 200. Consumer 202 purchases digital content and downloads the content from merchant 200. In this model, merchant 200 offers policy insurance to consumer 202 when consumer 202 purchases the content. As illustrated, consumer 202 purchases the offered policy 3 from merchant 200. When consumer 202 purchases the content with the optional insurance, the merchant/insurer generates additional information binding the buyer to that specific copy of the content. The merchant then stores that information for each consumer.

Figure 2B:
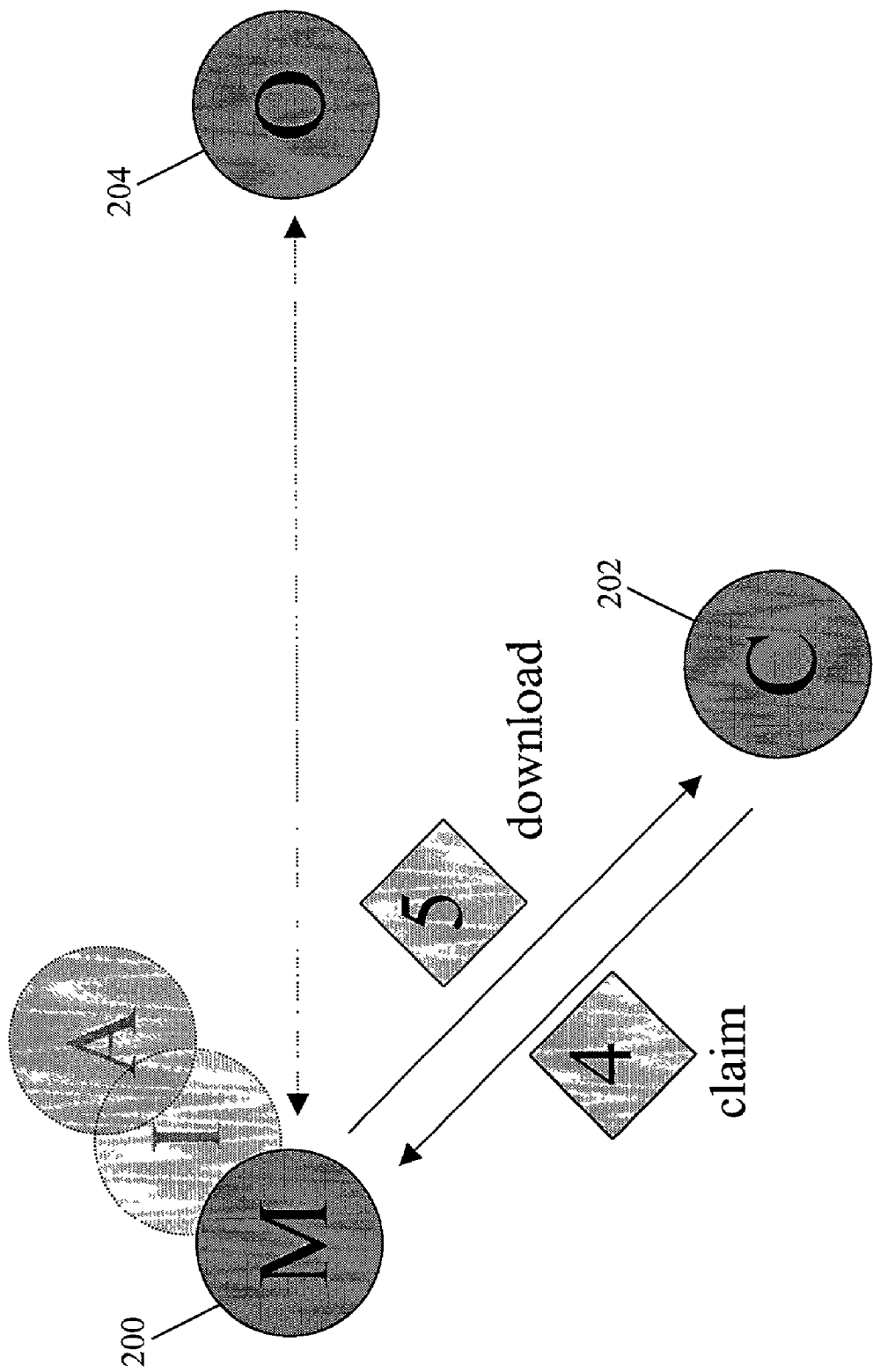

As illustrated in FIG. 2b, at a later date, consumer 202 contacts merchant/insurer 200 and files a claim 4 for a new download of the same material, either in identical or different format. The merchant/insurer 200 verifies the identity of consumer 202 and the information generated and stored during the original transaction. If all the controls check out, consumer 202 is authorized to download the new copy 5. A record of this transaction is kept and taken into consideration if or when the same consumer files subsequent claims.

Alternatively, rather than downloading content from merchant 200 as illustrated, consumer 202 downloads content directly from content owner 204.

Some limitations of the first embodiment just described is that as consumers shop at different merchants/insurers, they would need to create new policies with each merchant as each merchant independently acts as an insurer. Should accidental loss of data occur, it is likely to affect content that was originally purchased at different sites and therefore multiple claims would need to be filed. Moreover, consumers may forget at which store the content was originally purchased. A similar problem would arise if the content owners performed the role of insurance companies. Since individual titles are of limited value (although the aggregation of many titles may amount to a significant figure), this distribution model may not generate enough interest by consumers due to the unwieldy claim process.

Figure 3A:
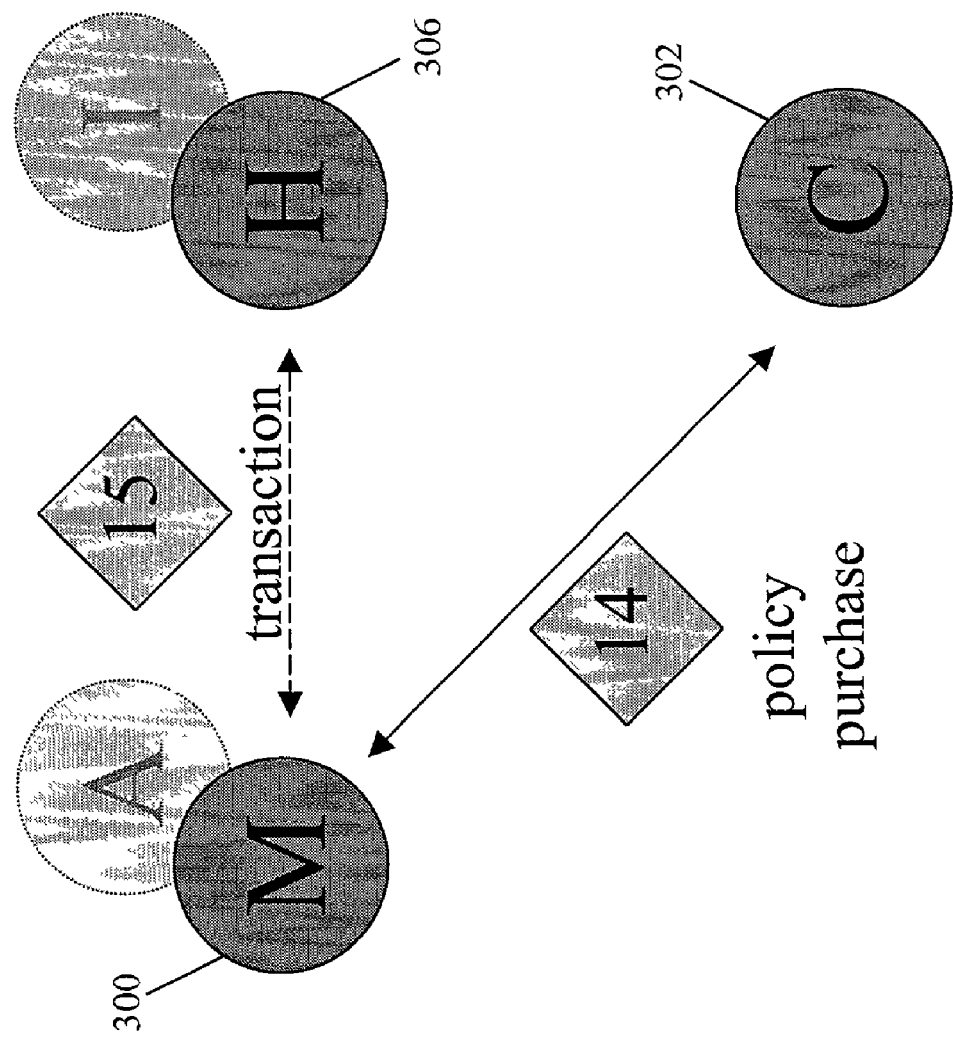
FIGS. 3a and 3b, collectively, illustrate an embodiment in which a third party maintains and verifies insurance policy information.
Figure 3B:
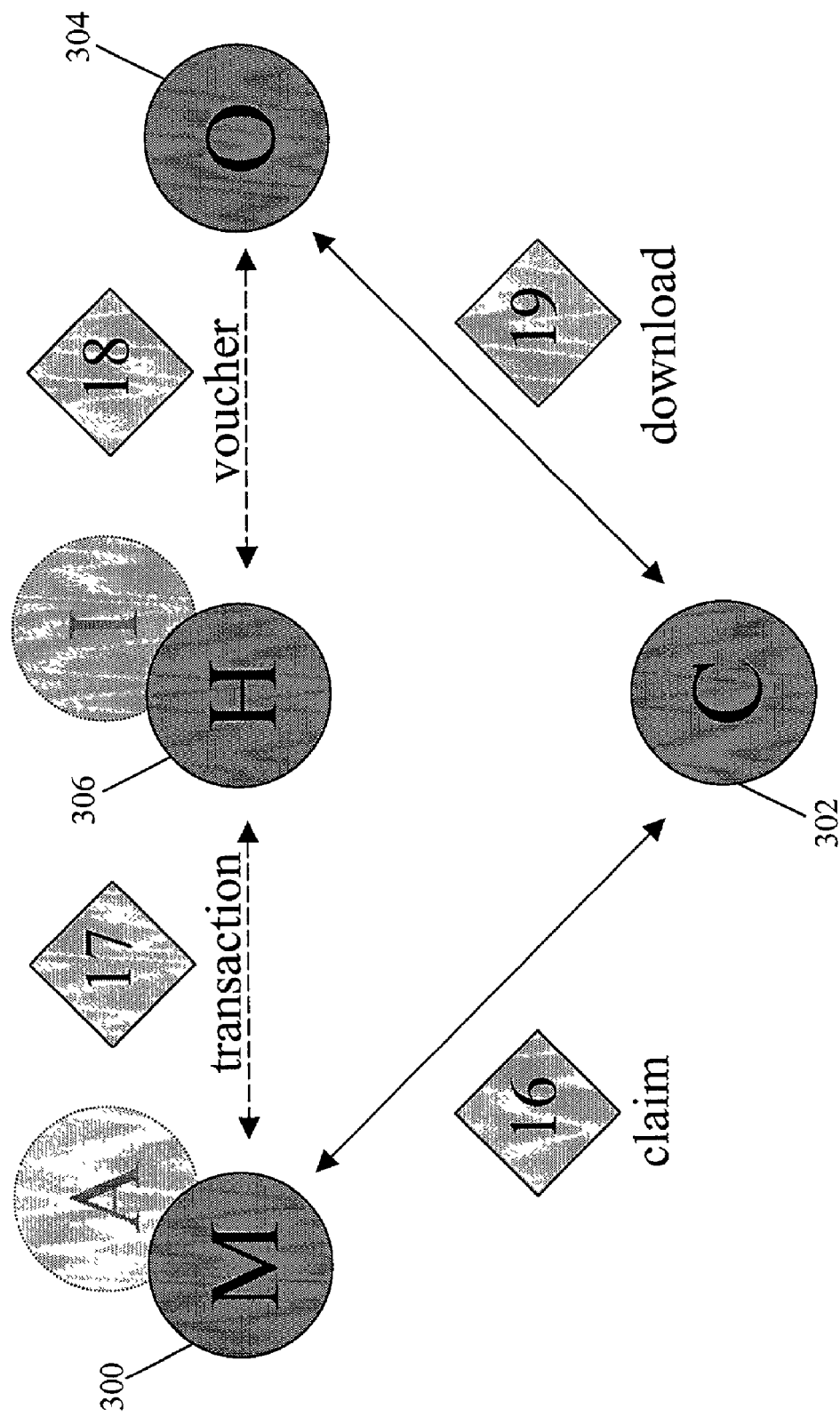

A second embodiment, which improves upon the first embodiment by addressing its limitations, is illustrated in FIGS. 3a and 3b. Rather than have each merchant act as an insurer, this role is decoupled from the merchant and a third party acts as the insurer. This broker aggregates, in one policy, content purchased at different merchants. Diverse items are insured under one policy irrespective of where they were purchased from. A single claim is filed to recover lost data or upgrade the content to a newer format.

Generally, in this embodiment, merchants 300 are considered insurance agents, selling the services of the insurer for a share of revenue. Acting as agents, merchants 300 also provide the front end to the claim process. In this model, when consumers (C) 302 purchase content from merchants (M) 300, consumer 302 is additionally given the option of purchasing insurance on the digital content that is purchased. When consumers 302 purchases the policy 14 through merchant 300, this policy is maintained and provided by insurer 306. In this manner, the consumer need not remember what merchant they purchased the content and insurance from, as the policy is maintained at clearing house 306. Insurer 306 then acts to verify the validity of any claims later filed by consumer 302.

A clearing house, as used in the prior art electronic distribution model, is involved in the secure distribution of content and is uniquely positioned to provide the content insurance service. All transactions, irrespective of who a merchant or content owner are, go through this clearing house, and therefore the original purchase can be verified. Moreover, a clearing house may have access to additional information about the consumer or his/her equipment that can be used to further limit fraud. This party has direct or indirect access to the content, and can therefore replace lost items or upgrade formats easily. As such, in a preferred embodiment, a clearing house acts as the third party insurer 306.

In some cases, multiple clearing houses may exist. Each clearing house may handle content by specific content owners, perhaps in an exclusive arrangement. Merchants may operate with one or more clearing houses. In such a scenario, insurer 306 maintains the consumer's policy information and operates with multiple clearing houses to collect information relevant to such policy. Similarly, upon a claim, the insurer selects one clearing house (e.g. the policy may include information about which content was handled by which clearing house) to issue a voucher. The exchange of information between clearing houses and insurer is protected through mechanisms similar to those used in securing communication between merchants and clearing houses, namely digital signatures.

While merchants 300 provide the front end to the consumers, clearing house 306 controls the actual fulfillment of orders (i.e., content download) and maintains the insurance policies. It should be noted that the clearing house (H) and the content repository (O) are illustrated as two independent entities (parties) and thus rights management and actual download are performed as two steps. However, in alternate embodiments these roles are performed by a single party.

Consumer (C) 302 purchases 10 content at merchant's site (M) and is given the option of acquiring content insurance. If the user does not elect the insurance, the transaction is simply forwarded 14 to clearing house (H) 306. However, when consumer 302 elects to buy the insurance 14 and the transaction is forwarded 15 to the clearing house (H), a flag is used to indicate that content insurance has been purchased. The list of titles just acquired is added to a consumer's existing policy or a new account is created for first time customers. In either case, a voucher 12 is created indicating the purchase of the content 12 and consumer 202 downloads 13 the purchased content.

Consumers 302 who register are not required to save any record of this transaction. If they need to file a claim 16 for loss of data or to upgrade their format, all they need to do is go to one of the participating insurance agents (merchants) 300 and identify themselves (most likely by providing a user i.d. or account number and a password; usual techniques for dealing with "forgotten" passwords are applied.) The insurance agent accesses the policy information stored at the clearing house/insurer and presents this data to the consumer. It should be noted that this data is not restricted to titles purchased from the merchant acting as the insurance agent for the claim; in fact, this could be an independent party that does not participate in sales of content.

Consumer 302 then selects from the titles protected under the existing policy that he or she wishes to restore or upgrade. This triggers a transaction 17 very similar to the one used for the purchase of new content, except that it flags this as a restore/upgrade.

Clearing house 306 verifies that the titles selected are indeed covered under the policy for this consumer. Other checks, possibly related to the underlying copyright protection mechanism (explained below), may be performed at this point. If the transaction is approved, a voucher is created 18 and transmitted to content owner 304 which permits consumer 302 to download 19 the digital content in the same, or new format.

It should also be noted that, in the above embodiment, information must pass between merchant, insurer and content owner (as indicated by dashed lines) at the time of purchase. While illustrated in a manner that would normally indicate that this information is transmitted directly between these parties, this is not to be seen as a limiting factor. As will be described hereinbelow, this information is also capable of being transmitted indirectly between these parties through the use of client software.

The above clearing house embodiment is easy to implement with only incremental effort relative to the purchase and distribution of the actual content because the clearing house already processes all transactions in prior art systems. However, there are instances when it would be preferable to use a third party insurer that is not the clearing house that aggregates, in one policy, content purchased at different merchants. In order to provide for this embodiment, an insurance purchasing and processing system is provided that does not require any communication between merchants and the insurer at the time of purchasing content insurance which provides the additional flexibility.

Figure 4B:
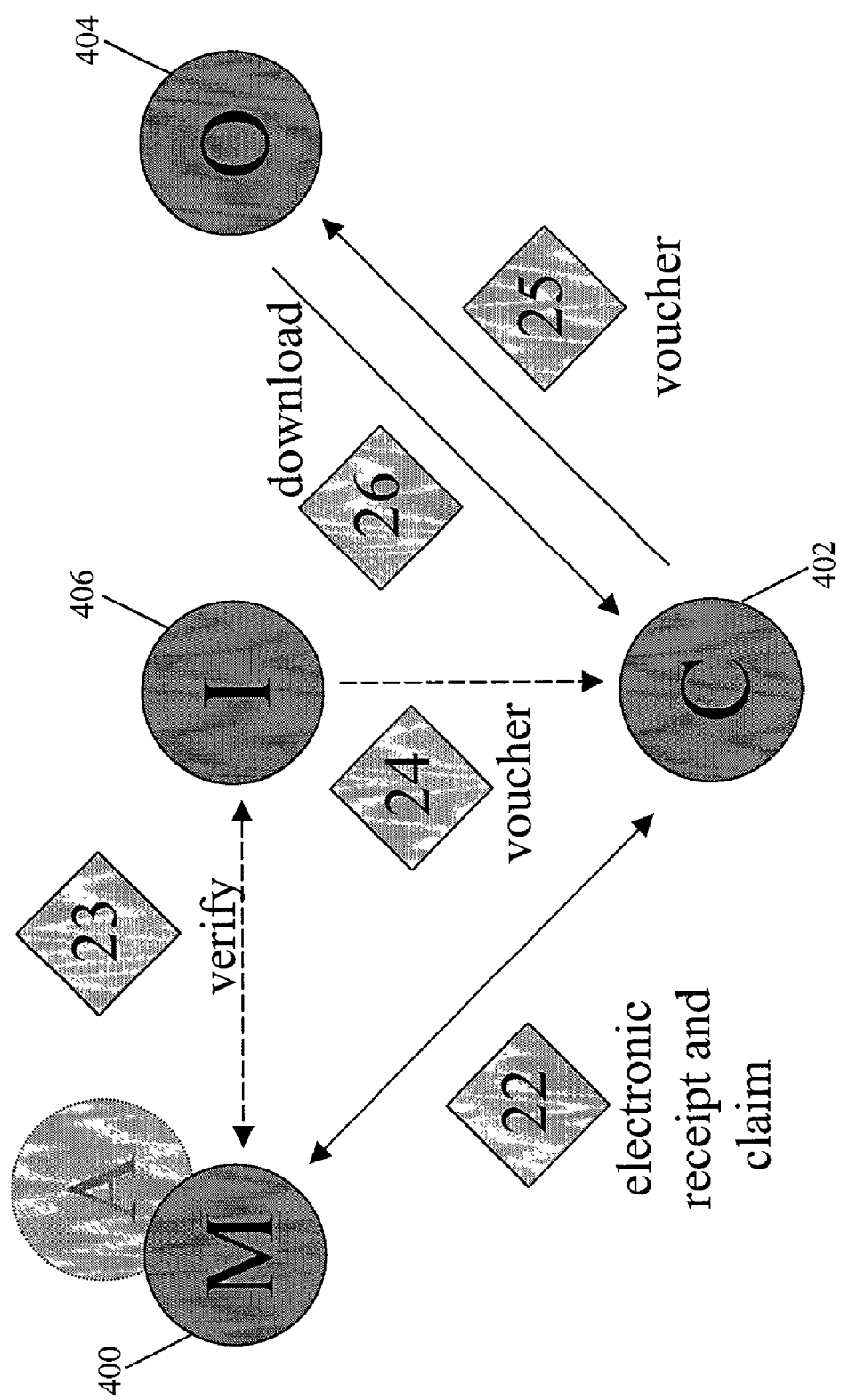

In this embodiment, illustrated in FIGS. 4a and 4b, merchant 400 again plays the role of insurance agent. Insurer 406 is a third party that does not necessarily take part in the purchase, rights management and download of content.

Insurance agents 400, who have a contractual agreement with the insurer 406, have public/private encryption key pair. When a transaction for the purchase of content and corresponding insurance takes place 20, an electronic receipt 21 including the details of the transaction is generated and digitally signed (using the agent's private key) 21. Consumers 402 are responsible for maintaining a copy of this electronic receipt in order to be able to file a claim for the content covered by it.

When a claim or upgrade request is filed 22, with any insurance agent, consumer 402 submits all digitally signed electronic receipts as proof that the original transaction effectively took place. The signatures are verified 23 before the claim is accepted, and an electronic voucher is generated, signed by insurer 406, and transmitted 24 to consumer 402.

This voucher is redeemed 25 at participating merchants or content repositories in order to download 26 the content. In this embodiment, rather than maintaining the policies, the insurer simply verifies the receipt presented while the merchant still provides the front end for insurance purchasing and claims. In this manner flexibility is provided in the distribution of insurance.

It should be noted that a flow of funds between insurance agents (who collect fees) the insurer/clearing house and the content owners takes place in the above embodiments, generally, as part of an out-of-band protocol, however, this does not constitute part of the present invention and has not been described herein for clarity. Any method of collecting or distributing monies can be utilized without departing from the scope of the present invention.

Figure 5A:
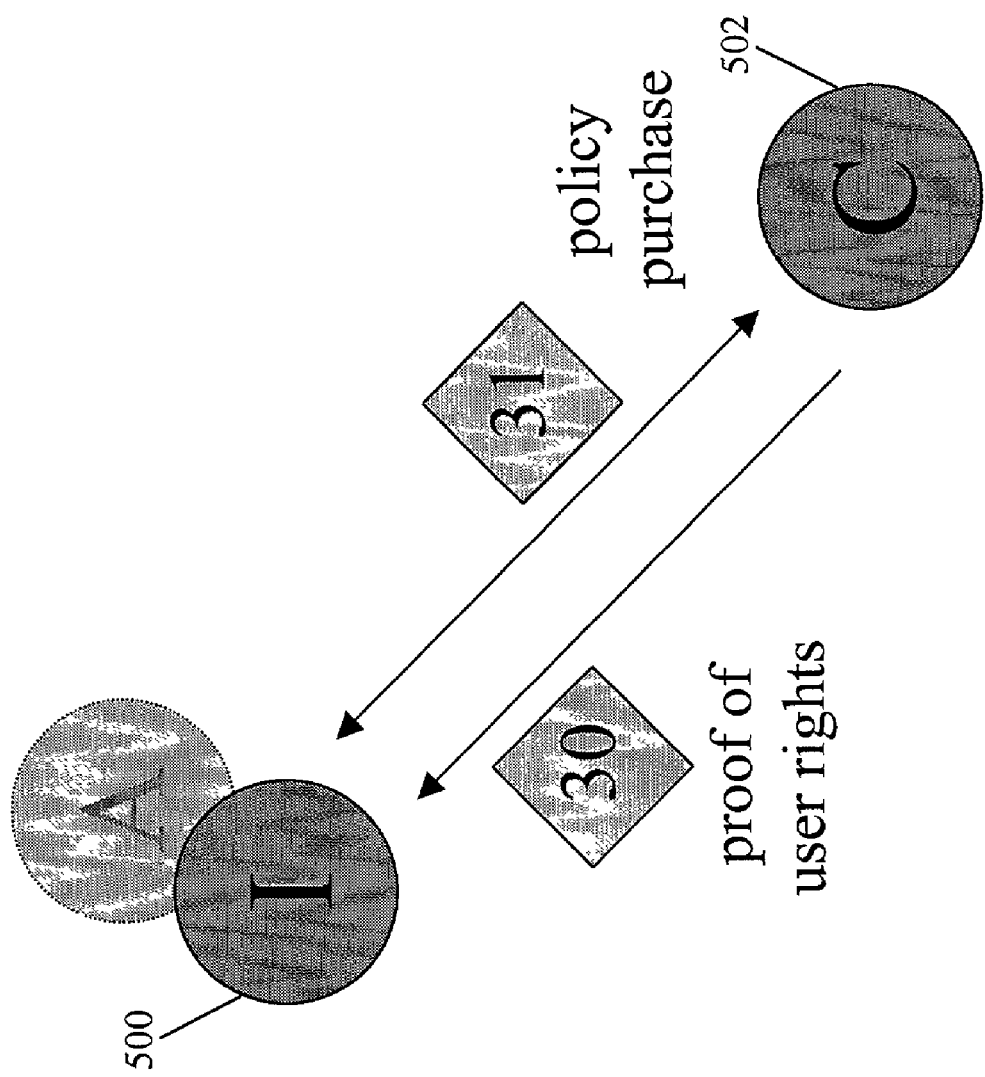
FIGS. 5a and 5b, collectively, illustrate an embodiment in which insurance is purchased at a time disjoint from the purchase of content.
Figure 5B:
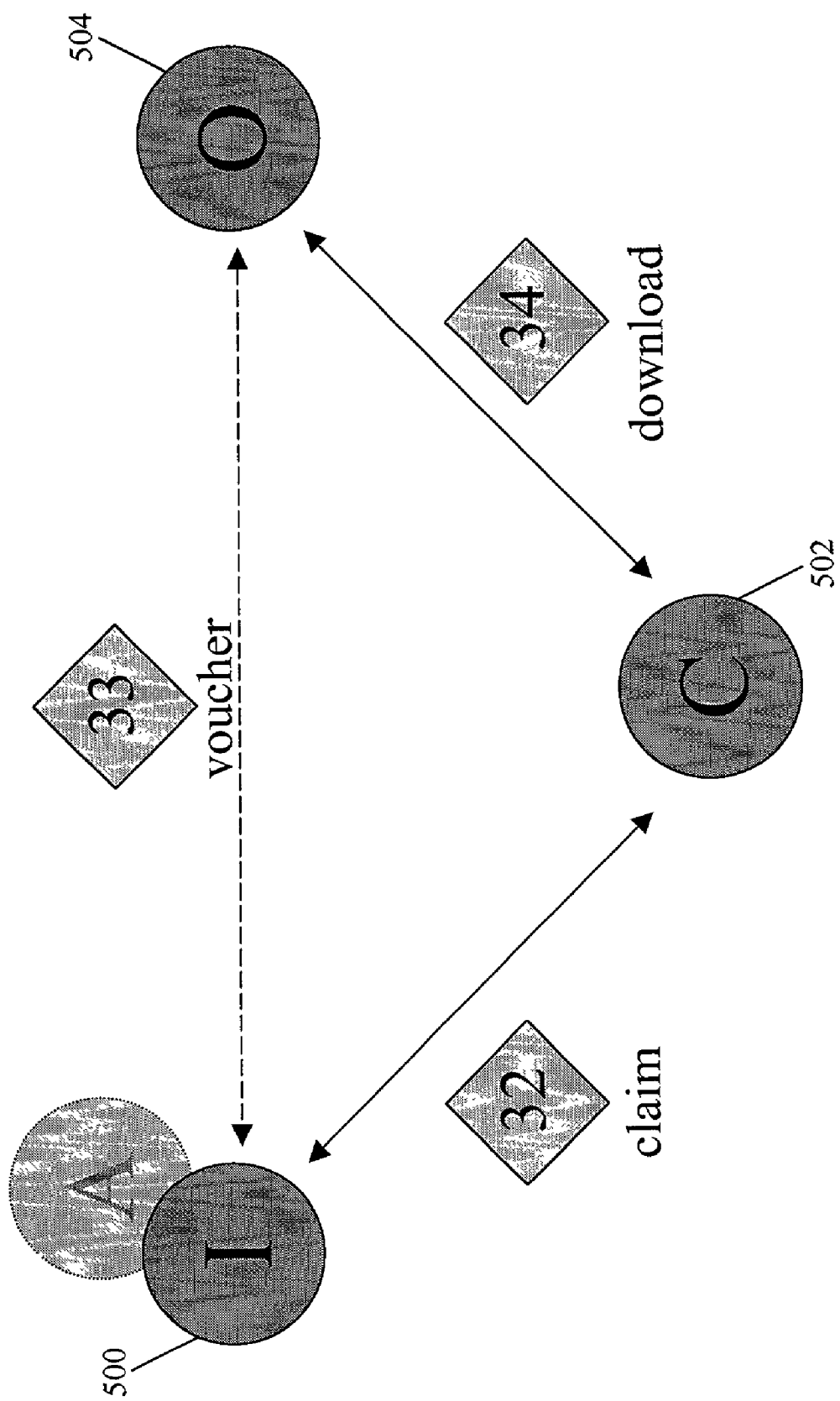
Figure 6A:
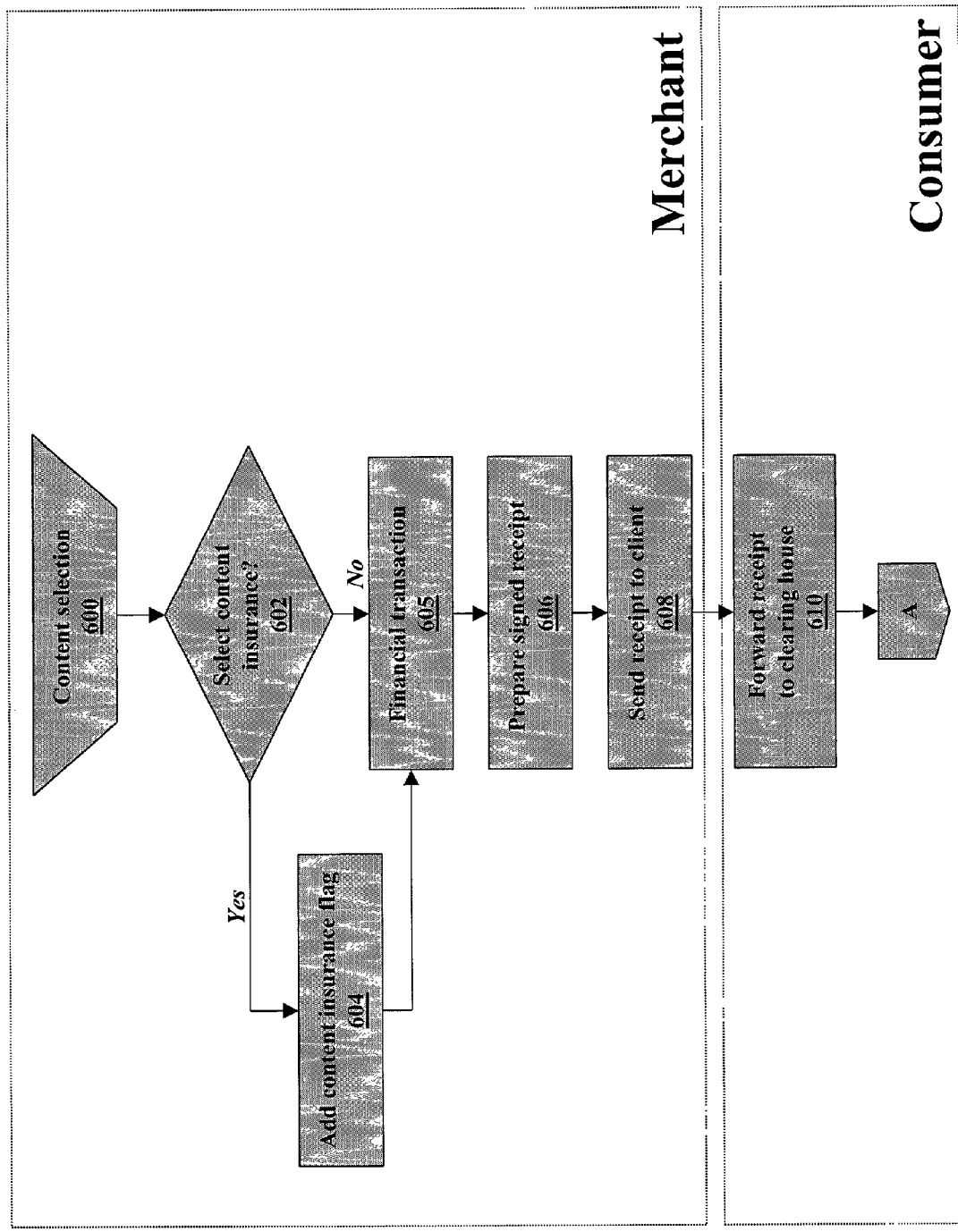
FIGS. 6a-6d, collectively, illustrate an example purchase transaction of the second embodiment of the present invention which additionally employs the copyright protection scheme.
Figure 6B:
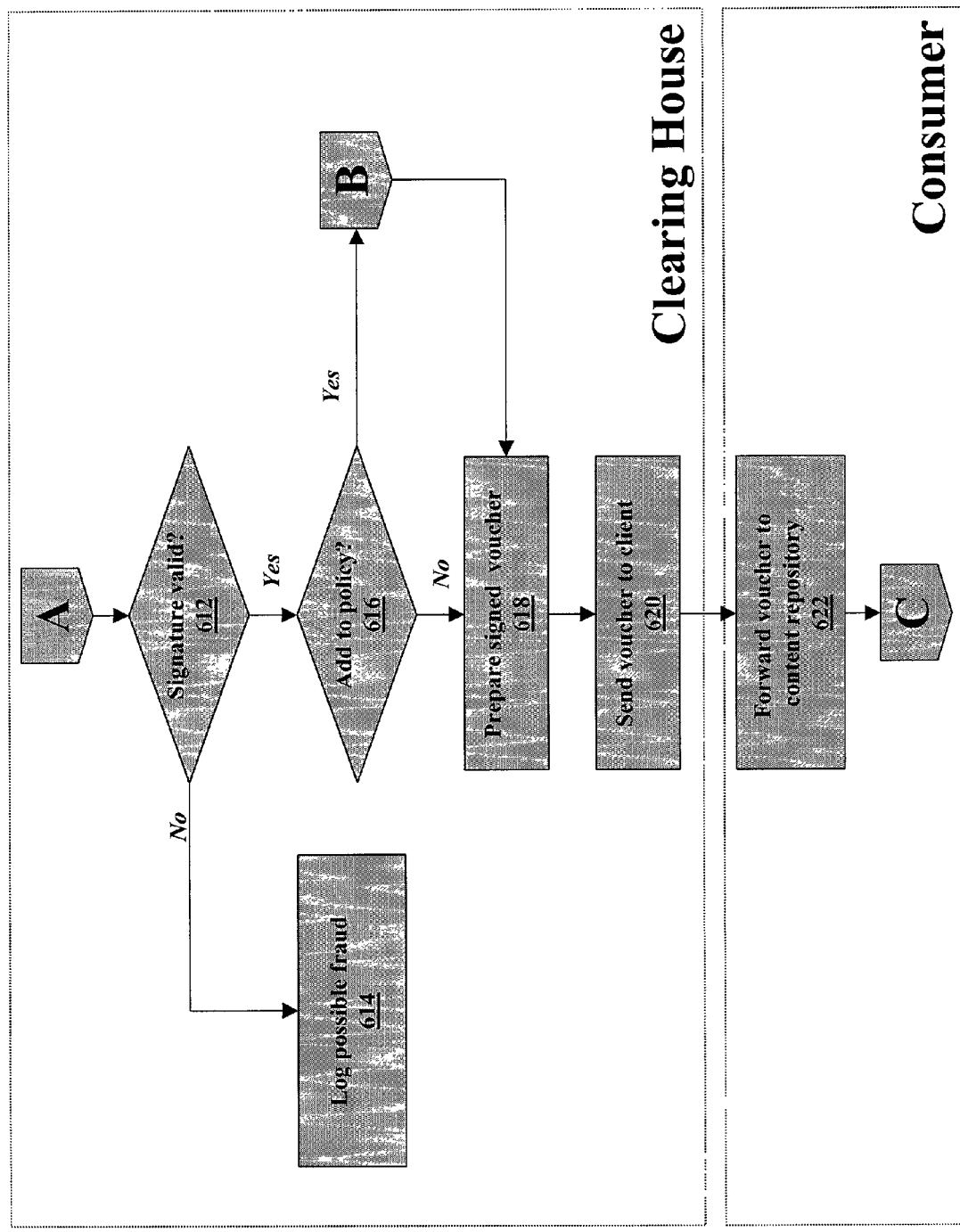
Figure 6C:
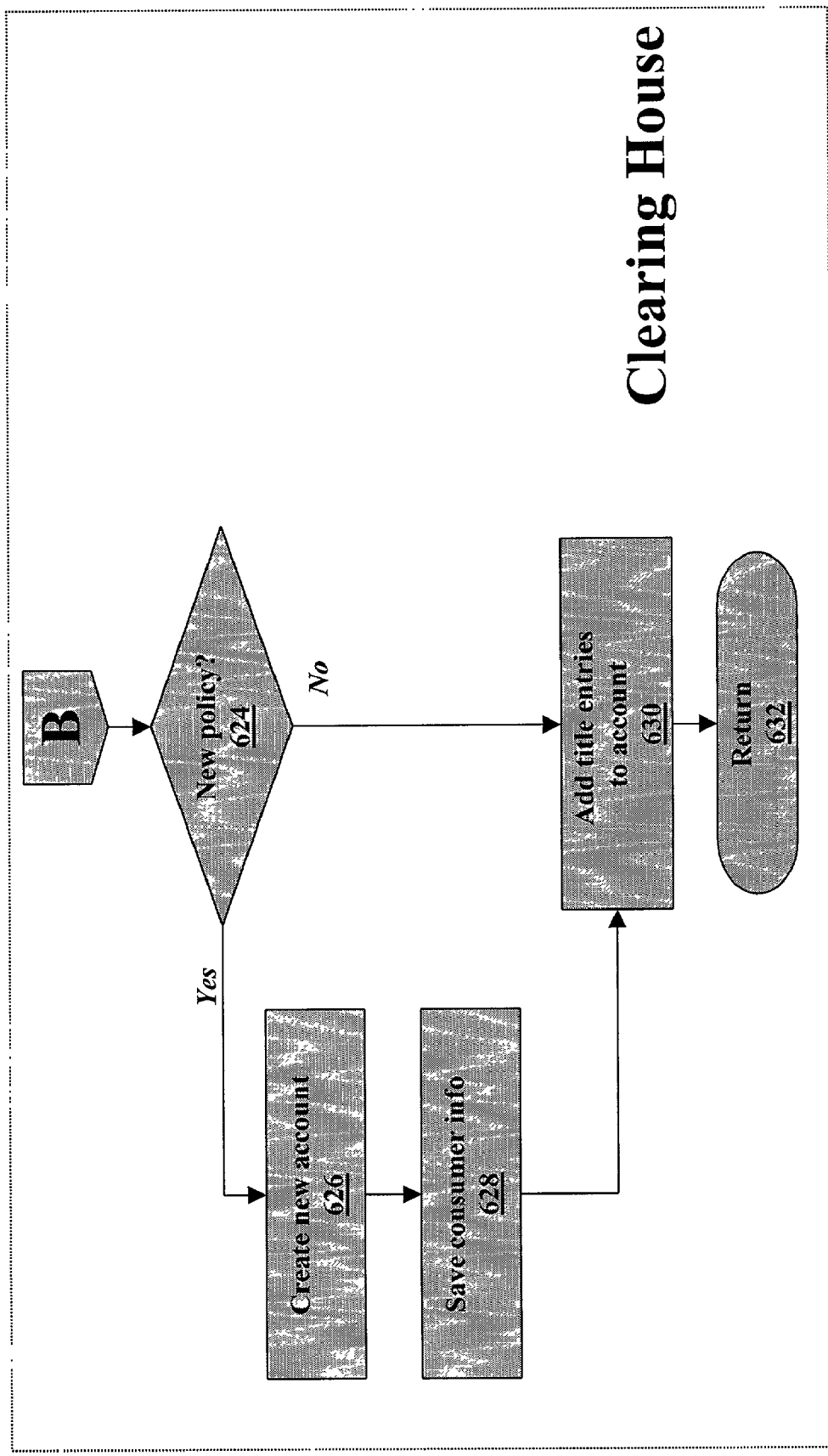
Figure 6D:
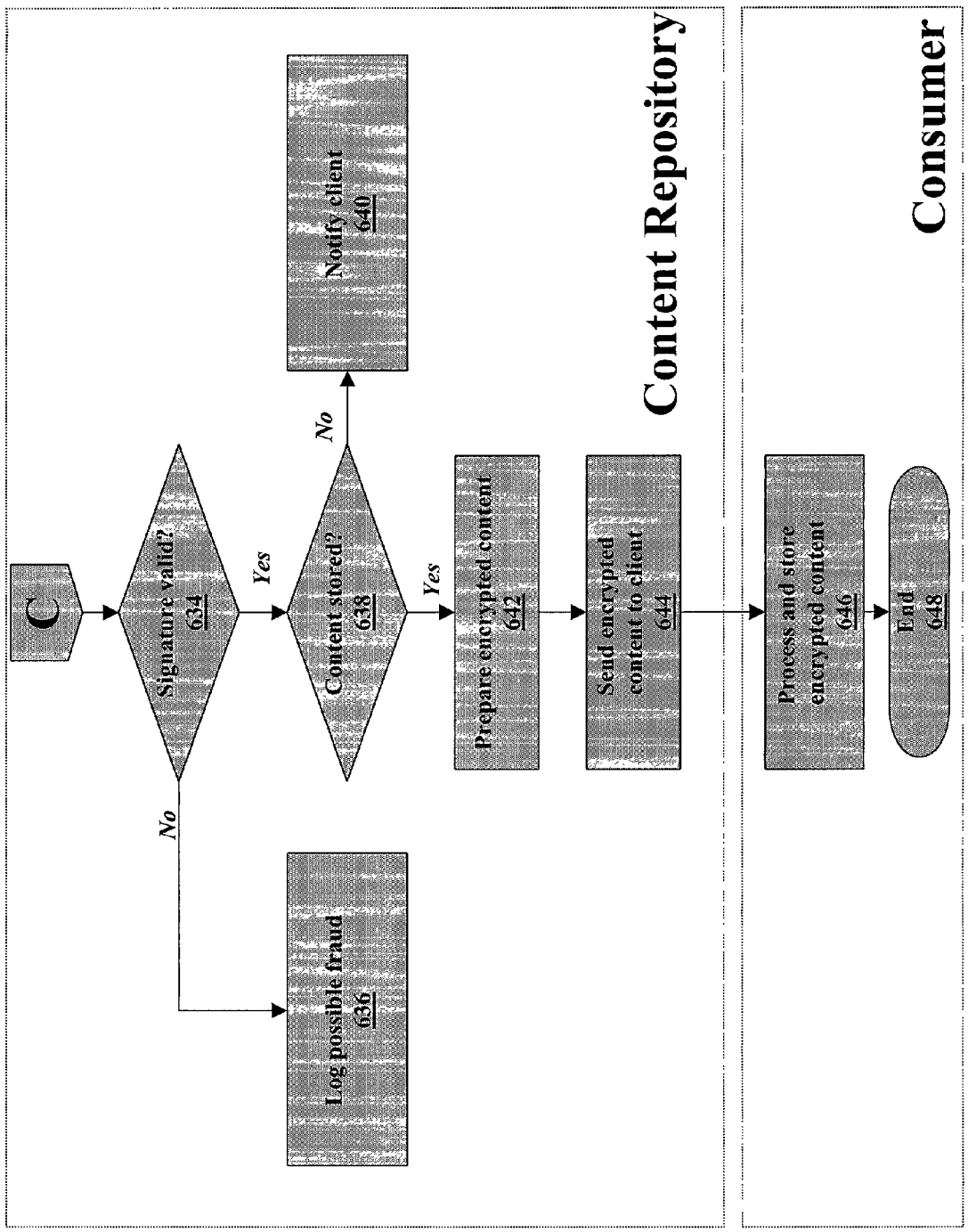
Figure 7B:
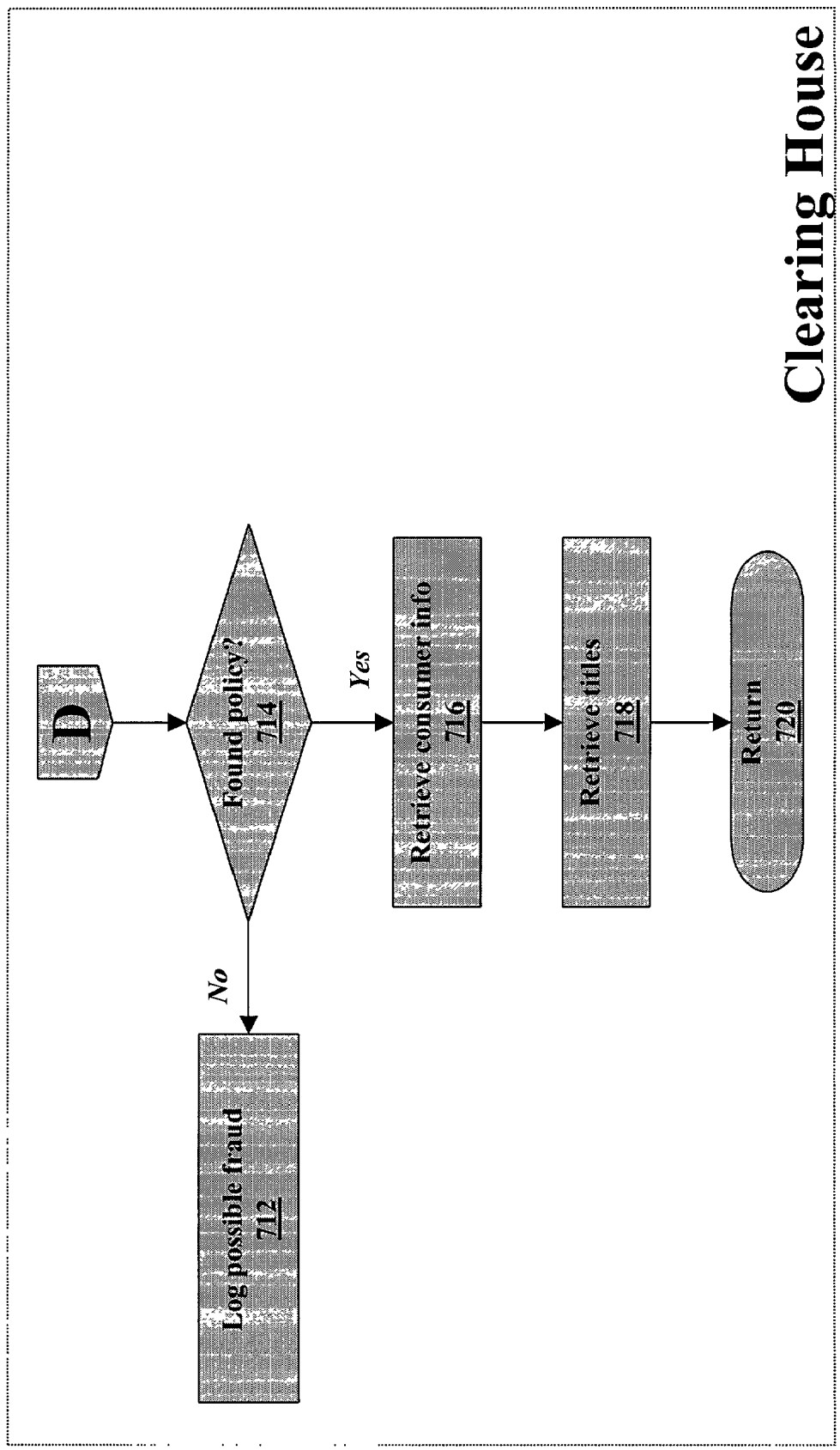
Figure 7D:
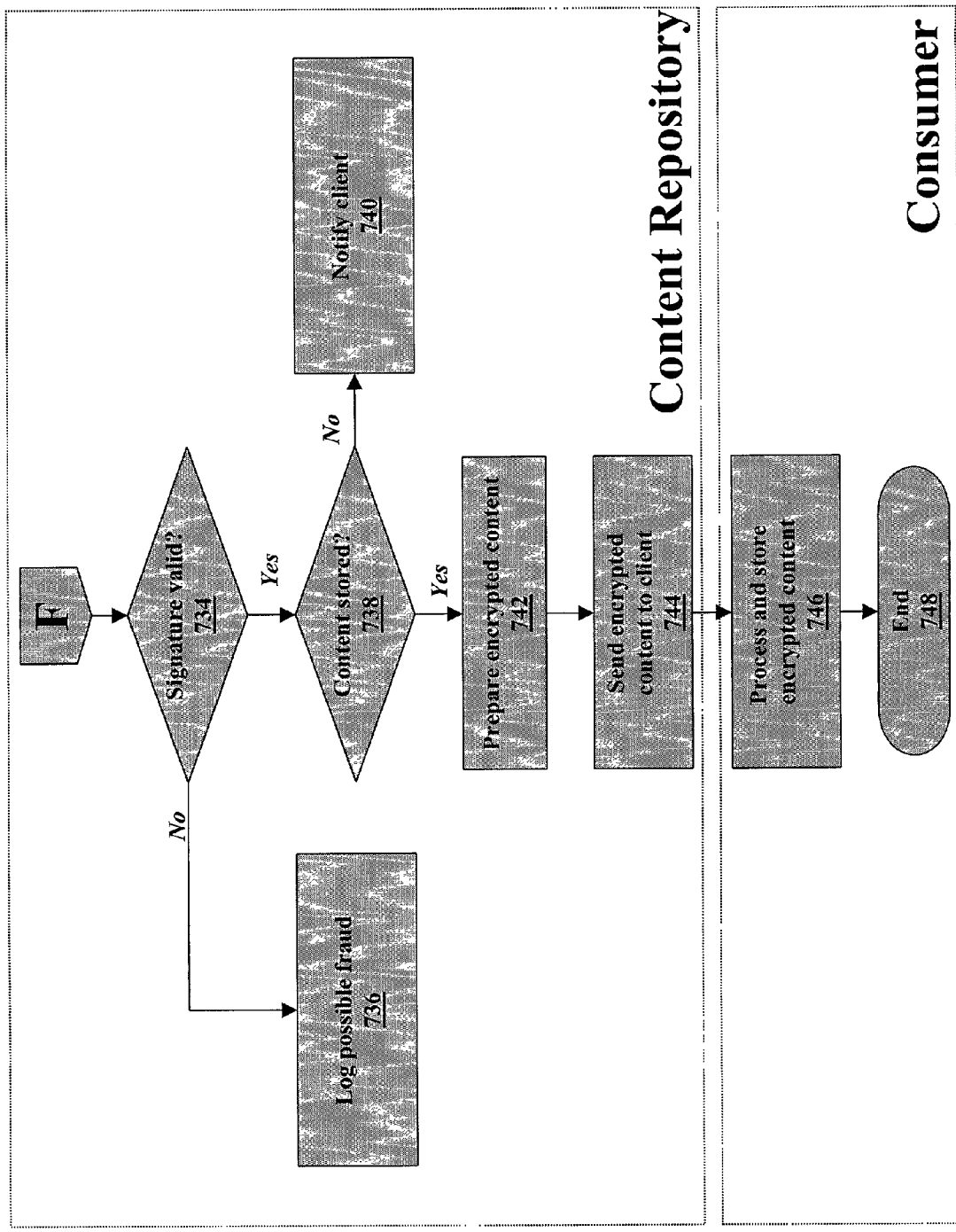

The above embodiments couple the purchase of insurance with the purchase of the digital content. As such, merchants act as insurance agents. The embodiment described in relation to and illustrated in FIGS. 5a and 5b is one in which consumer 502 is able to purchase insurance on his or her digital content at a time after the actual purchase of the digital content. In this embodiment, consumer 502 goes to insurer 500, which can be separate from merchants, content owners or clearing houses, to purchase insurance policies on the content which the consumer owns. It should be noted that while this embodiment provides certain advantages by allowing the purchase of insurance separate from the purchase of the content, it does so at the expense of requiring a more complex procedure for adding titles to a policy in order to minimize risk of fraud.

When purchasing insurance 31, in order to open a new account or add titles to an existing policy, consumer 502 contacts an insurance agent, which in the present discussion is the insurer itself and presents a list of titles that he/she claims ownership to. Before the insurer can accept these titles and issue insurance on them, it must verify 30 that the user is in fact legally entitled to them. In order to be able to do this, a copyright protection scheme (described below) supports being queried for available legal content. Moreover, because the insurer must trust the copyright protection system, stringent requirements are placed on a mechanism to ensure the integrity of this system. For this reason, support for content insurance is implemented as part of the copyright protection client software.

When consumer 502 makes a claim 32, the list of protected titles, as kept by insurer 500, is presented to the consumer for selection. Consumer 502 selects which titles he or she wishes to download and an electronic voucher is generated that is transmitted to the consumer, content owners or merchants which is redeemed to download the content.

The copyright protection system is introduced with respect to the embodiment in which consumers are able to purchase insurance on their digital content at a time after the actual purchase of the digital content, however, it should be noted that use of the copyright protection system in other embodiments is within the spirit and scope of the present invention.

While a specific copyright protection scheme is described, other schemes are envisioned, however, there are a number of requirements for efficiently, securely providing copyrighted content in a policy.

These requirements of the copyright protection scheme are:

The ability to detect that the content is compliantly protected, i.e., was legally acquired;

A binding between the protected content and an entity (alternatively, more than one entity) that could be either a person or business, i.e., the consumer, or a piece of hardware (hard drive, computer, consumer electronics device, removable media, etc.);

In embodiments in which policy information is not stored at a central third party, a facility to recover the rights management system's binding to the original entity even after a complete loss of data;

For embodiments in which the consumer must maintain copies of the receipts in which they have acquired insurance, e.g., where the communication between merchant and clearing house at purchase are alleviated and where insurance purchase is decoupled from content purchase, the scheme is modified to provide the capability of generating a digitally signed document in an agreed upon format listing the content to which the policy holder has acquired rights.

There are currently several commercially available systems for copyright protection, usually called Digital Rights Management Systems or DRMS, that are used for the distribution of licensed content.

Consumers interested in purchasing copyrighted content first download a program (the client) to their computer. Subsequently, users may browse for content at a participating online merchant, pay the purchase price for their selection and initiate download of encrypted content.

The content is stored encrypted on the consumer's system, using a key unique to the specific instance of the client software. This guarantees that if the encrypted content were to be transferred to another computer, it would not be usable. This is denoted personalized encryption, to differentiate it from other techniques that use a system-wide encryption key or similar schemes to ensure compliance.

A mechanism for recovering an instance of a client should it get corrupted, erased, or in case of an upgrade or system change is provided. The exact mechanism is not a part of the present invention, but this feature provides a guarantee that a user's collection of content can be recovered even in the case of total data loss at the client.

The DRMS client is modified to generate a digitally signed list of the content to which the user has been granted a license. This list is a proof of user rights, which is signed using a private key specific to the client instance. The corresponding public key is verified by appending a digital certificate signed by the root system key.

Using this scheme, when a consumer 502 wishes to create a content insurance policy or add content to an existing one, he or she instructs the client to generate a proof of user rights. This document is then be uploaded 30 to the agent 500, where the signature is verified before accepting the list of titles.

While it is believed the foregoing description is sufficient to enable one of skill in the art to practice the present invention, the following description is given in order to provide a further illustration of the principles of the present invention. The following description is made with regards to the clearing house embodiment and FIGS. 2a-2c are utilized in conjunction with FIGS. 6a-6d and FIGS. 7a-7d during the discussion.

A consumer 202 directs his or her browser to an online merchant, which supports the present invention. If not already installed, consumer 202 downloads a free client software which is installed on the PC. Consumer 202 browses the titles available and finds and decides to purchase several of the titles 600. Consumer's browser displays the content to be purchased and gives the option of purchasing content insurance on the titles selected. Consumer 202 elects to purchase the insurance and a content insurance flag is set 604. When consumer 202 accepts the order, the merchant's software, having verified the credit card information and triggered the financial transaction 605, prepares an electronic receipt 606 which is digitally signed with the merchant's private key.

This receipt is sent to and received 608 by the client software running on the consumer's computer and forwarded 609 to the clearing house 206. There, the receipt is examined, after verifying the merchant's signature 612 (using the corresponding private key), to determine if content insurance was purchased 616 A list of titles is also extracted from the receipt. As content insurance was purchased, a determination is made as to whether or not an account exists for the consumer 624. If an account exists the titles are added to the account 630, otherwise an account is created 626, 628 and the titles entered into it 630.

The clearing house then generates a voucher. The voucher, digitally signed by the clearing house, is then sent 620 to the client software, which in turn sends 622 it to a number of content repositories. For simplicity's sake, in the present example, the content repositories are managed by content owners.

The voucher's signature is verified 634 and upon verification a determination is made as to whether the content is stored in the repository 638. When it is stored in the repository, it is encrypted so as to only be able to be used with the client instance at the consumer's computer, sent to and received by the client 644, 646, 648.

At a later time, consumer 202 decides to upgrade the format of the purchased content (or recover lost content). Consumer 202 navigates to a merchant which supports the content insurance system. After consumer 202 identifies himself to the system by providing name and credit card information, merchant's site initiates a retrieval of the consumer's policy 700 by communicating with clearing house 206. Clearing house 206 looks for the corresponding policy 614 and when found retrieves consumer information and the titles in the policy 716, 718. This information is then transmitted back to the merchant's system 720 and displayed to consumer 202. The titles consumer 202 wishes to upgrade or recover are selected from the displayed list of titles in their policy 702. In some embodiments, a charge is made at the time of upgrade or recovery and as such, a financial transaction 704 would occur at this point between consumer 202 and merchant 200. In embodiments where the charge is not per upgrade or recovery, this step is skipped. An electronic receipt including the titles to upgrade/recover and signed by merchant 200 using the merchant's private key is then prepared and sent to client software 706, 708. The client software then forwards this receipt to clearing house 206.

At clearing house 206 the merchant's signature (using the corresponding private key) is verified 722 and the titles elected for upgrade recovery are extracted from the receipt. These titles are compared to those in the consumer's policy to insure the titles ordered are in the policy. Once verified, clearing house 702 then generates a voucher 728. The voucher, digitally signed by clearing house 202, is then sent 730 to the client software, which in turn sends 732 it to a number of content repositories.

The voucher's signature is verified 734 and upon verification a determination is made as to whether the content is stored in the repository 738. When it is stored in the repository, it is encrypted so as to only be able to be used with the client instance at the consumer's computer, sent to and received by the client 742, 744, 746.

The present system provides for numerous economic and value-added advantages to the parties in the system. Because the marginal cost of distributing content electronically is close to zero, all revenue generated would essentially be profit to be distributed among the many parties that partake in the transaction. If deep discounts can be obtained from the content owners, this service could be offered at significant margins, while at the same time adding value to consumers.

The above enhancements for commercial digital content distribution and its described functional elements are implemented in various computing environments. For example, the present invention may be implemented on a conventional IBM PC or equivalent, multi-nodal system (e.g. LAN) or networking system (e.g. Internet, WWW, wireless web). All programming, lists, content and data related thereto are stored in computer memory, static or dynamic, and may be retrieved by the user in any of: conventional computer storage, display (i.e. CRT) and/or hardcopy (i.e. printed) formats.

CONCLUSION

A system and method has been shown in the above embodiments for the effective implementation of providing content insurance for distributed digital content. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware, specific encryption schemes, specific copyright protection systems or specific distribution network. In addition, the specific roles indicated are representative of the preferred embodiment and should not limit the scope of the invention. Various content distribution models can be selected to couple content insurance with commercial digital content.

The invention claimed is:

1. An article of manufacture comprising a computer user medium having computer readable code embodied thereon which provides a method of insuring purchased distributed digital content for a consumer of said purchased digital content, said medium comprising:
    (a) computer readable program code receiving an indication a consumer has purchased content insurance on specified purchased digital content distributed via communication networks, said content insurance insuring said consumer against loss of said specified purchased digital content;
    (b) computer readable program code maintaining information identifying said consumer and indicating said consumer has purchased content insurance on said specified purchased digital content;
    (c) computer readable program code receiving a claim to recover lost digital content from said consumer;
    (d) computer readable program code verifying said lost digital content is the same as said specified purchased digital content for which said content insurance was also purchased;
    (e) computer readable program code transmitting a new copy of originally purchased digital content in (a) to said consumer via said communication networks.

2. The article of manufacture of claim 1, wherein said new copy of originally purchased digital content is in the same format as said lost digital content.

3. The article of manufacture of claim 1, wherein said content insurance further allows said consumer to upgrade said specified purchased digital content to a new encoding format.

4. The article of manufacture of claim 3, said medium further comprising:
    computer readable program code receiving an indication said consumer has made a claim to upgrade digital content to a new format;
    computer readable program code verifying said digital content to be upgraded is the same as originally purchased digital content in (a) for which said content insurance was also purchased;
    computer readable program code transmitting said originally purchased digital content of (a) in a new encoding format via said communication networks.

5. The article of manufacture of claim 4, said medium further comprising:
    computer readable program code charging said consumer an amount for said originally purchased digital content of (a) in a new encoded format which is a fraction of the price for a new purchase of said specified purchased digital content in said new encoding format.

6. The article of manufacture of claim 5, wherein terms and conditions of associated with said content insurance includes any of: a limited number of format upgrades or a limited time for which upgrades are available with the option of renewal.

7. The article of manufacture of claim 1, wherein said content insurance was purchased at a cost which is a fraction of the price of said specified purchased digital content.

8. The article of manufacture of claim 1, wherein terms and conditions associated with said content insurance includes any of: restrictions on the number of claims that can be filed, payment of a deductible for a claim, requiring disclosure of private information by said consumer when making a claim, or having a limited term with the option of renewal.

* * * * *